United States Patent
Jeong et al.

(10) Patent No.: US 8,149,753 B2
(45) Date of Patent: Apr. 3, 2012

(54) METHOD AND APPARATUS FOR ALLOCATING MULTICAST CONNECTION IDENTIFIER USED FOR IP MULTICAST PACKET TRANSMISSION OVER PORTABLE INTERNET NETWORK AND TRANSMITTING PACKET USING THE MULTICAST CONNECTION IDENTIFIER

(75) Inventors: Sangjin Jeong, Daejeon (KR); Myung-Ki Shin, Daejeon (KR); Joo-Chul Lee, Daejeon (KR); Hyoung-Jun Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 847 days.

(21) Appl. No.: 12/280,512

(22) PCT Filed: Feb. 21, 2007

(86) PCT No.: PCT/KR2007/000903
§ 371 (c)(1),
(2), (4) Date: Aug. 22, 2008

(87) PCT Pub. No.: WO2007/097571
PCT Pub. Date: Aug. 30, 2007

(65) Prior Publication Data
US 2009/0067360 A1     Mar. 12, 2009

(30) Foreign Application Priority Data

Feb. 23, 2006 (KR) .................. 10-2006-0017890
Nov. 16, 2006 (KR) .................. 10-2006-0113475

(51) Int. Cl.
*H04H 20/71* (2008.01)
(52) U.S. Cl. ...................................... 370/312
(58) Field of Classification Search .................. None
See application file for complete search history.

(56) References Cited

U.S. PATENT DOCUMENTS

| | | | |
|---|---|---|---|
| 5,917,819 A | 6/1999 | Yang et al. | |
| 6,163,692 A * | 12/2000 | Chakrabarti et al. | 455/416 |
| 2003/0079030 A1* | 4/2003 | Cocotis et al. | 709/229 |
| 2005/0255862 A1 | 11/2005 | Jung et al. | |
| 2005/0265360 A1 | 12/2005 | Kim et al. | |

OTHER PUBLICATIONS

Heejin Jang, et al., "Link-local Multicast Packet Transmission in 802.16 Networks", (12 pages).

(Continued)

*Primary Examiner* — Hassan Phillips
*Assistant Examiner* — Prenell Jones
(74) *Attorney, Agent, or Firm* — Staas & Halsey LLP

(57) ABSTRACT

Provided is a method and apparatus for allocating a multicast connection identifier (MCID) for Internet protocol (IP) packet transmission over a portable Internet network and transmitting packets using the MCID. More specifically, there is provided a method of defining and allocating an MCID for transmitting an IP version 6 (IPv6) multicast packet over an IEEE 802.16/Wireless Broadband (WiBro) network and a process for transmitting an IP multicast packet of a base station (BS) using the MCID. The method of allocating is related to a method of automatically generating a connection identifier (CID) having 16 bits for packet transmission over the IEEE 802.16/WiBro network in order to transmit the IPv6 multicast packet. In this method, a scope value of the IPv6 multicast packet is added to the MCID. Therefore, multicast packets having an effective IPv6 scope such as a multicast packet in a link-local category, a multicast packet in a site-local category, and a multicast packet in a global category can be transmitted over the IEEE 802.16/WiBro network according to the scope of the multicast packet. Accordingly, when a new IPv6 scope is defined, the method can be naturally applied.

4 Claims, 6 Drawing Sheets

OTHER PUBLICATIONS

HU.S. PATENT DOCUMENTS H. Jeon, et al., "IPv6 NDP for Common Prefix Allocation in IEEE 802.16", (14 pages).

International Search Report mailed on May 21, 2007 in connection with International Application No. PCT/KR2007/000903.

* cited by examiner

METHOD AND APPARATUS FOR ALLOCATING MULTICAST CONNECTION IDENTIFIER USED FOR IP MULTICAST PACKET TRANSMISSION OVER PORTABLE INTERNET NETWORK AND TRANSMITTING PACKET USING THE MULTICAST CONNECTION IDENTIFIER

CROSS REFERENCE TO RELATED PATENT APPLICATIONS

This application claims the benefit under 35 U.S.C. Section 371, of International Application No. PCT/KR2007/000903, filed Feb. 21, 2007, which claimed priority to Korean Application No. 10-2006-0017890 filed Feb. 23, 2006, and Korean Application No. 10-2006-0113475 filed Nov. 16, 2006, in the Korean Intellectual Property Office, the disclosures of which are hereby incorporated by reference.

BACKGROUND OF THE INVENTION

1. Field of the Invention

The present invention relates to a method and apparatus for allocating a multicast connection identifier (MCID) used for Internet protocol (IP) multicast packet transmission over a portable Internet network and transmitting the packet using the MCID, and more particularly, to a method of defining and allocating an MCID for IP version 6 (IPv6) multicast packet transmission over an IEEE 802. 16/Wireless Broadband (WiBro) network, and an IP multicast packet transmission process of a base station (BS) using the MCID. Namely, the present invention relates to a method and apparatus for allocating an extensible MCID over the IEEE 802.16/WiBro network in order to transmit an IPv6 multicast packet in a link layer using a connection ID (CID) that is used to transmit packets of an IP layer over a link layer.

2. Description of the Related Art

In general, a multicast is a transmission to specified users in which a user from among a group of users who are connected to a local area network (LAN) or Internet transmits information to several users and the several users who receive the information transmit the same information to many users in a bucket relay manner. Unlike a Unicast which is a transmission to a single specified user and a broadcast which is a transmission to many unspecified users, the multicast means a transmission of information to several specified terminals.

In order to transmit an IP multicast packet over a portable Internet network such as an IEEE 802.16 network, a base station (BS) which connects hosts according to characteristics of a point-to-multipoint connection in the portable Internet network is used.

In general, when a transmitting host transmits an IPv6 multicast packet in a link-local category to a BS1 over the IEEE 802.16 network, the BS1 transmits the received IP multicast packet to hosts in a subnet1 by using an MCID that is allocated to a destination address of the received IPv6 multicast packet. However, according to the related art, there is a problem in that it is difficult to transmit a multicast packet that is not in the link-local category but instead is in a site-local or global category over the IEEE 802.16 network. In addition, an MCID is generated for every IPv6 multicast address, so that there is a problem in terms of extensibility.

In particular, unlike a wireless network such as an IEEE 802.11, the IEEE 802.16/WiBro network does not support a multicast function in a link layer, so that it is difficult to use an IPv6 neighbor discovery function that is a basic necessity for applying the IPv6. Currently, a method of transmitting an IPv6 multicast packet by extending a CID in the IEEE 802.16/WiBro network is being discussed by the Internet Engineering Task Force (IETF).

Up until now, a method of transmitting an IPv6 link-local scope multicast packet has been discussed. In particular, the method includes allocating a CID to every IPv6 link-local scope multicast address. However, this method results in that too large a portion of a CID having a 16-bit length that is used publicly to transmit a unicast packet and a control packet in a link layer in addition to a multicast packet has to be used for the IPv6 multicast packet transmission. Therefore, transmission performance of the unicast packet or the like can be affected. In addition, when the number of multicast addresses increases, there is a problem in terms of extensibility.

Another method discussed together with the aforementioned method is a method of allocating a public CID for multicast packet transmission. In this method, there is a problem in that when multicast packets use the same CID, multicast packets in various categories cannot be transmitted over the same network.

In order to provide a IPv6 multicast service in a network, multicast packets having various scopes in addition to a link-local scope have to be transmitted at the same time.

SUMMARY OF THE INVENTION

The present invention provides a method and apparatus for allocating a multicast connection identifier (MCID) for Internet protocol (IP) multicast packet transmission over a portable Internet network and transmitting packets by using the MCID, so that it is possible to allocate an extensible MCID in order to transmit Internet protocol version 6 (IPv6) multicast packets having various scopes over an IEEE 802.16/Wireless Broadband (WiBro) network, and transmit IPv6 multicast packets by using the MCID.

According to an aspect of the present invention, there is provided a recording medium recording a data structure of an MCID, wherein the MCID includes: a convergence sublayer (CS) descriptor value which represents a sublayer used for IP (Internet protocol) multicast packet transmission over a portable internet network; and a scope value which represents a subnet category of a subnet in which the IP multicast packet is transmitted over the portable Internet network.

According to another aspect of the present invention, there is provided a method of allocating an MCID for IP multicast packet transmission in various categories over a portable Internet network, the method including: identifying a sublayer used for the IP multicast packet transmission and including a CS descriptor value representing the sublayer as one or more bits in the MCID; and identifying a subnet category of a subnet in which the IP multicast packet is transmitted and including a scope value representing the subnet category as one or more bits in the MCID.

According to another aspect of the present invention, there is provided a base station (BS) for transmitting an IP multicast packet which is received over a portable Internet network to receiving hosts in various categories by using an MCID, the BS including: a scope identifier identifying a subnet category of the destination address by using the MCID which is allocated to the destination address, the MCID including a scope value of a destination address of the IP multicast packet as a one field value; a receiving host transmitter transmitting the IP multicast packet to the receiving hosts in the subnet category of the BS based on the MCID allocated to the destination address when the identified subnet category of the destination address belongs to the subnet category of the BS; and a BS transmitter transmitting the IP multicast packet to another BS which includes the subnet category of the destination address through an upper access router when the identified subnet category of the destination address does not belong to the subnet category of the BS.

According to another aspect of the present invention, there is provided a method of transmitting an IP multicast packet received from a transmitting host to receiving hosts in various categories by the BS by using an MCID over a portable Internet network, the method including: identifying a subnet category of the destination address by using the MCID allocated to the destination address, the MCID including a scope value of a destination address of the IP multicast packet as a one field value; transmitting the IP multicast packet to the receiving hosts in the subnet category of the BS based on the MCID allocated to the destination address when the identified subnet category of the destination address belongs to the subnet category of the BS; transmitting the IP multicast packet to another BS which includes the subnet category of the destination address through an upper access router when the identified subnet category of the destination address does not belong to the subnet category of the BS; and transmitting the IP multicast packet to the receiving hosts in the subnet category of another BS by another BS which receives the IP multicast packet based on the MCID allocated to the destination address.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiment of the present invention will be described in detail with reference to the attached drawings.

Figure 1:
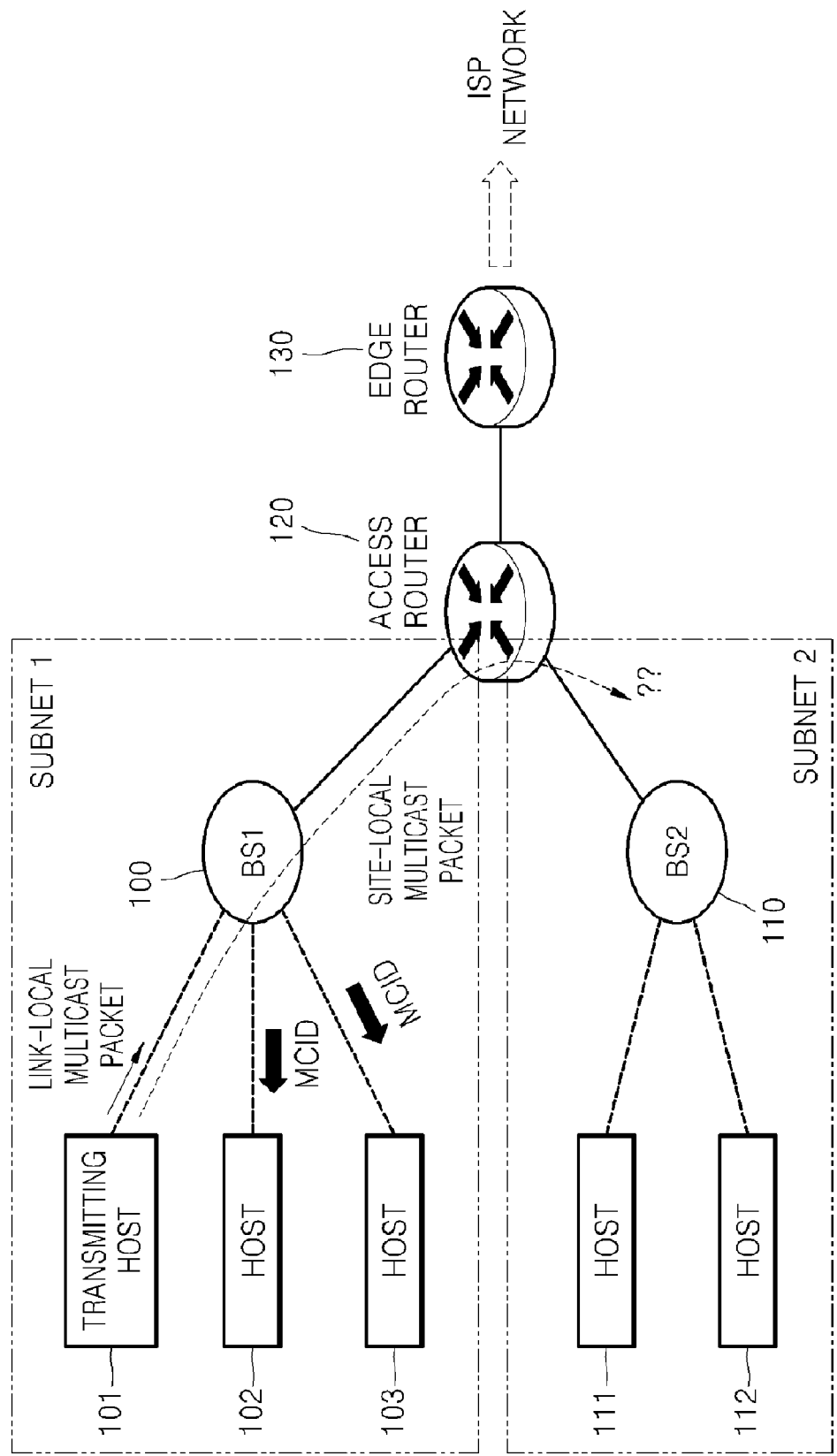
FIG. 1 is a conceptual view showing a process of transmitting an Internet protocol version 6 (IPv6) multicast packet using a multicast connection identifier (MCID) over an IEEE 802.16 network according to related conventional art.

FIG. 1 is a conceptual view showing a process of transmitting an Internet protocol version 6 (IPv6) multicast packet using a multicast connection identifier (MCID) over an IEEE 802.16 network according to related conventional art.

When a transmitting host 101 which belongs to a subnet1 transmits an IPv6 multicast packet in a link-local category to a base station (BS)1 100, the BS1 100 transmits the multicast packet to hosts 102 and 103 in the subnet1 network using an MCID allocated to a destination address of the received IPv6 multicast packet. However, in the related art, the transmitting host 101 cannot transmit the IPv6 multicast packet to hosts 111 and 112 connected to a BS2 110 which has a different destination in a portable Internet network including an IEEE 802.16 network to which an interactive multicast function in a link layer cannot be applied.

The present invention provides a method of transmitting an IP multicast to a destination in a different category, that is, to various other categories. Hereinafter, an embodiment of the present invention employing a construction for implementing the aforementioned method will be described in detail.

Figure 2:
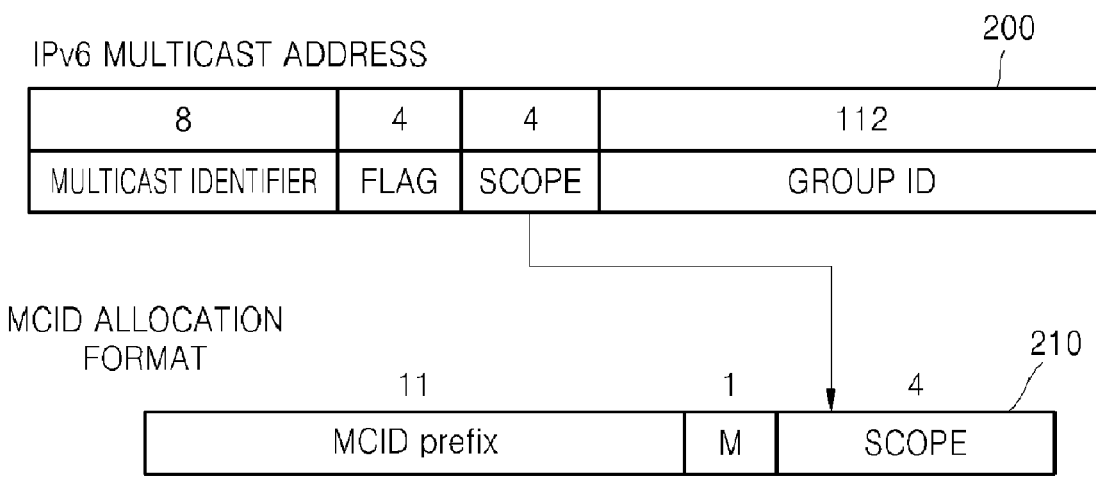
FIG. 2 is a conceptual view showing a structure of an MCID and a method of allocating the MCID according to an embodiment of the present invention.

FIG. 2 is a conceptual view showing a structure of an MCID and a method of allocating the MCID according to an embodiment of the present invention.

FIG. 2 shows a process in which an MCID 210 that is an address for multicast packet transmission over a portable Internet network is allocated from a 128-bit multicast address 200 that is an IPv6 address. The allocated MCID 210 has 16 bits. The MCID includes an MCID prefix, a convergence sublayer (CS) descriptor, and a scope field. The MCID prefix has 11 bits. Currently, a value used for the MCID prefix is not determined yet, however, a value provided by the Institute of Electrical and Electronics Engineers (IEEE) may be used.

An M flag which is the CS descriptor has 1 bit. When the M flag has a value of 1, it means that an IP CS from among sublayers used for packet transmission in an IP layer in an IEEE 802.16 link layer is used. When the M flag has a value of 0, it means that an Ethernet CS is used.

When the M flag has the value of 1, the scope field that has 4 bits has the same value as that of a scope field of a destination address of the IPv6 multicast packet included in an IEEE 802.16 link layer frame. Namely, the scope field has the same value as the scope field of the destination IP address of the IP multicast packet. The value of the scope field is used to indicate a transmission category of the multicast packet.

According to the current embodiment of the present invention, the CID is determined by using the IPv6 address of the transmitting host in a portable Internet network, the IPv6 packet is transmitted from the transmitting host to the BS by using the determined CID, and the BS transmits the multicast packet transmitted from the transmitting host to receiving hosts by using the MCID according to the destination address of the IPv6 multicast packet.

Figure 3:
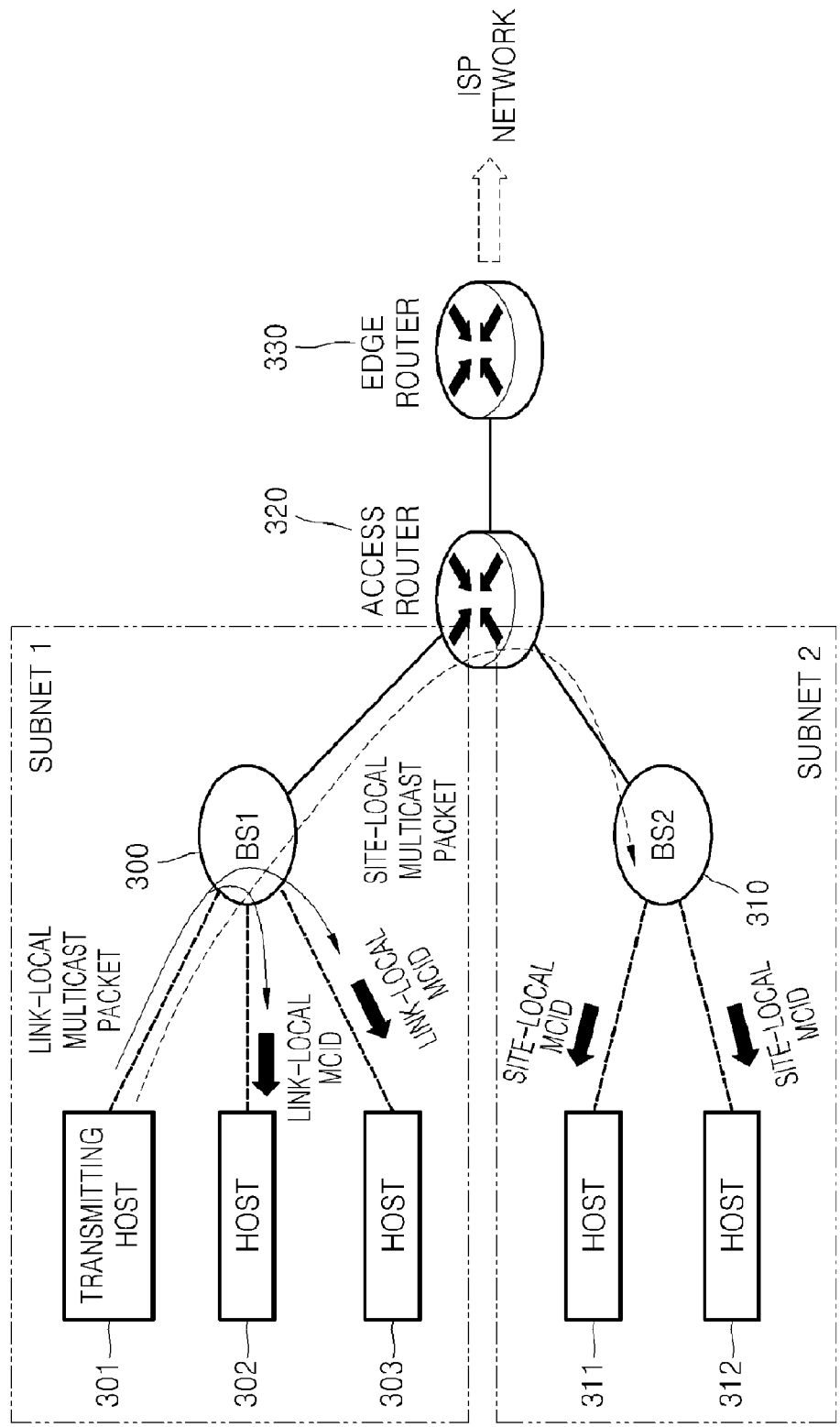
FIG. 3 is a conceptual view showing a process of transmitting an IPv6 multicast packet using an MCID over an IEEE 802.16 network according to an embodiment of the present invention.

FIG. 3 is a conceptual view showing a process of transmitting an IPv6 multicast packet using an MCID over an IEEE 802.16 network according to an embodiment of the present invention.

When a transmitting host 301 which belongs to a subnet1 transmits an IPv6 multicast packet in a link-local category to a BS1 300, the BS1 300 transmits the multicast packet to hosts 302 and 303 in the same subnet as the transmitting host 301 by using an MCID in a link-local category allocated to a destination address of the received IPv6 multicast packet. When the transmitting host 301 transmits a multicast packet that is not in the link-local category but instead is in a site-local category for example, the multicast packet is transmitted to an access router 320 through the BS1 300, and the access router 320 transmits the multicast packet to a BS2 310 in a subnet 2. The BS2 310 identifies a destination address the transmitted multicast packet. When the destination address has a multicast address in a site-local category, the BS2 transmits the multicast packet in the site-local category to hosts 311 and 312 in the subnet2 by using a site-local MCID. The access router 320 is connected to another access router through an edge router 330.

As described above, IP multicast packets can be transmitted to receiving hosts in various categories such as site-local as well as link-local.

Figure 4:
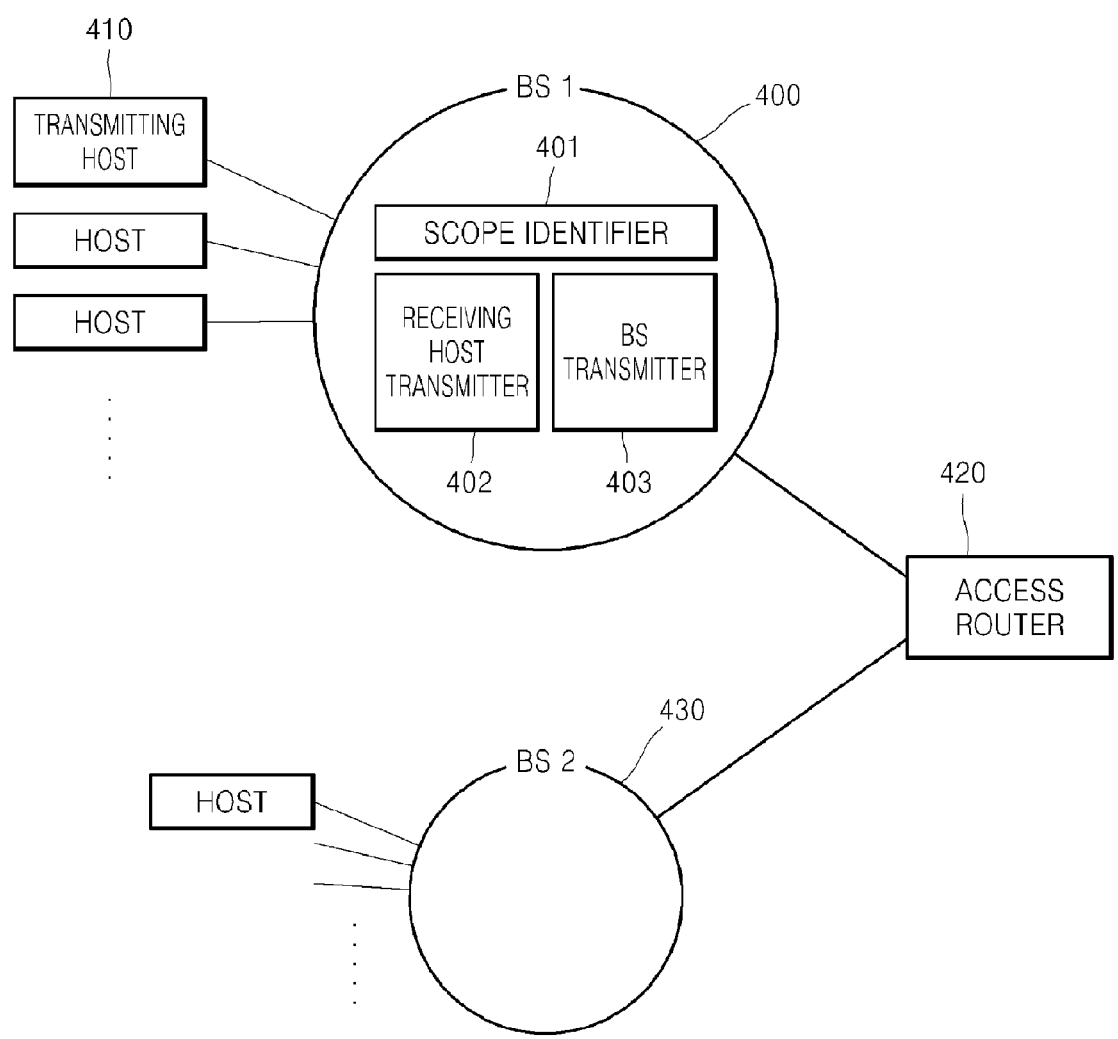
FIG. 4 is a view showing a structure of a base station (BS) for transmitting IPv6 multicast packets over an IEEE 802.16/WiBro network according to an embodiment of the present invention.

FIG. 4 is a view showing a structure of a base station (BS) for transmitting IPv6 multicast packets over an IEEE 802.16/WiBro network according to an embodiment of the present invention.

A BS 400 which receives an IP multicast packet from a transmitting host 410 as described above with reference to FIG. 3 includes a scope identifier 401 for identifying a subnet category of the destination address by using an MCID allocated to a destination address in order to transmit the IP multicast packet, a receiving host transmitter 402 which transmits the IP multicast packet to receiving hosts in the subnet category of the BS based on the MCID allocated to the destination address when the identified subnet category of the destination address is in a subnet category of the BS, and a BS transmitter 403 which transmits the IP multicast packet to another BS which includes a subnet category of the destination address through an upper access router when the identified subnet category of the destination address is not in the subnet category of the BS.

According to the aforementioned construction of the BS 400, the IP multicast packet can be transmitted to another BS 430 through the access router 420.

Figure 5:
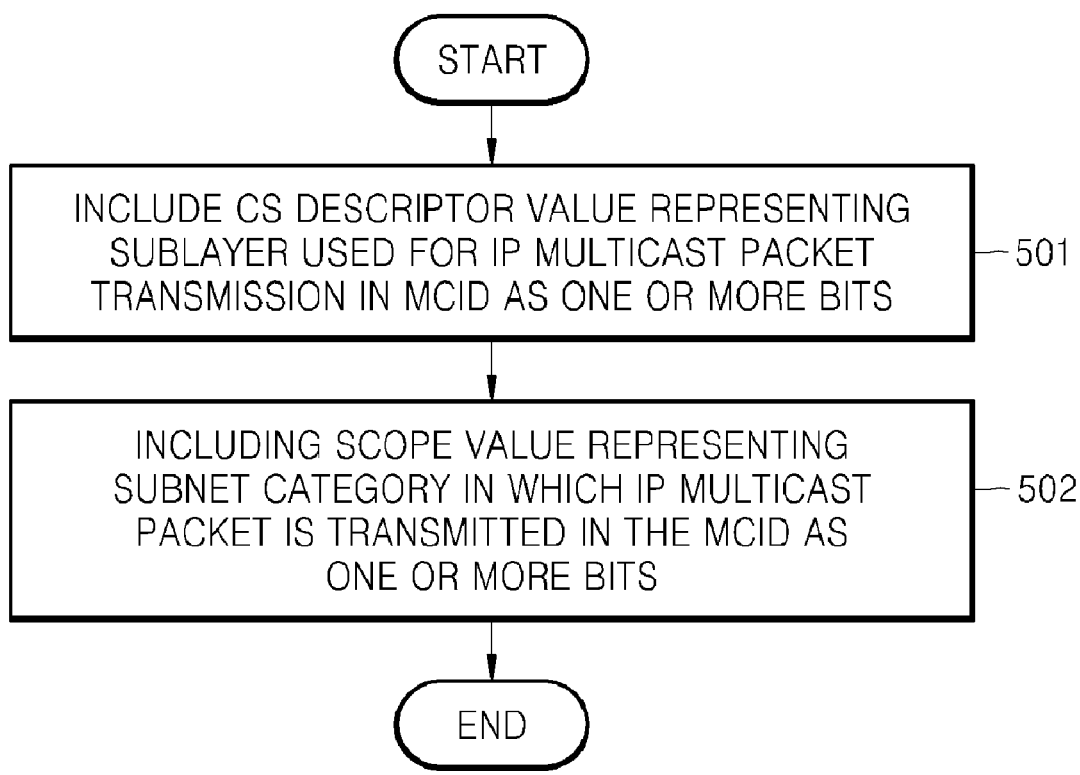
FIG. 5 is a flowchart of a method of allocating an MCID according to an embodiment of the present invention.

FIG. 5 is a flowchart of a method of allocating an MCID according to an embodiment of the present invention.

The method includes a step of including a CS descriptor value representing a sublayer used for IP multicast packet transmission as one or more bits in an MCID (operation 501) and a step of including a scope value representing a subnet category in which the IP multicast packet is transmitted as one or more bits in the MCID (operation 502). The order of operations 501 and 502 may be changed. When a CS prefix is further included in the MCID, the MCID is complete.

Figure 6:
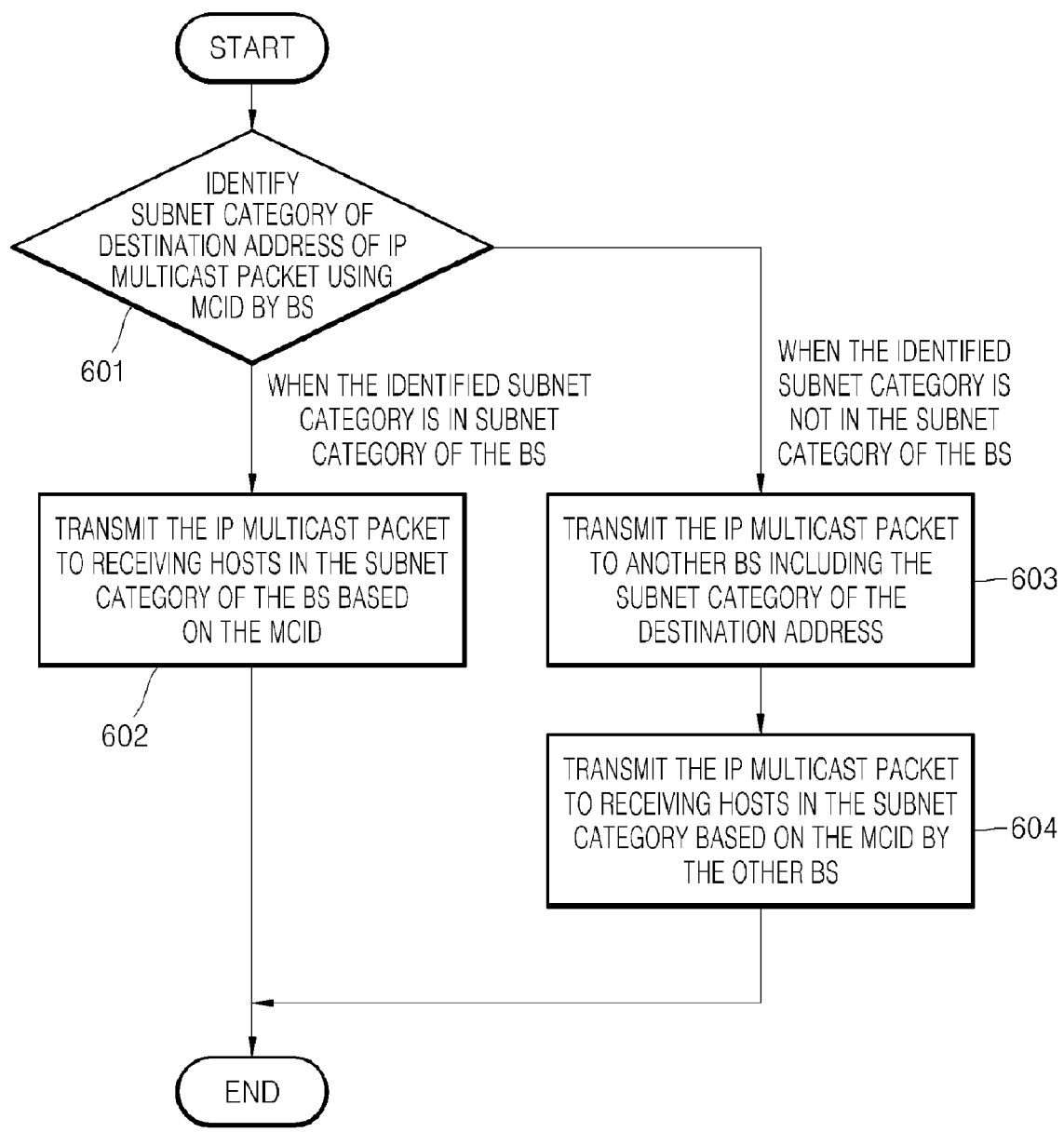
FIG. 6 is a flowchart of a method of transmitting an IP multicast packet to receiving hosts by a BS over an IEEE 802.16/WiBro network according to an embodiment of the present invention.

FIG. 6 is a flowchart of a method of transmitting an IP multicast packet to receiving hosts by a BS over an IEEE 802.16/WiBro network according to an embodiment of the present invention.

A BS in a portable Internet network identifies a subnet category of a destination address by using an MCID allocated to a destination address (operation 601). When the identified subnet category is in a subnet category of the BS, the BS transmits the IP multicast packet to receiving hosts in the subnet category of the BS based on the MCID allocated to the destination address (operation 602).

However, when the identified subnet category of the destination address is not in the subnet category of the BS, the IP multicast packet is transmitted to another BS which includes the subnet category of the destination address (operation 603), and the another BS transmits the IP multicast packet to receiving hosts in its own subnet category based on the MCID allocated to the destination address (operation 604).

As described above, in the method of allocating an MCID according to the embodiment of the present invention, an MCID is allocated according to a scope of an IP multicast address, so that multicast packets having various scopes in addition to a multicast packet of a link-local scope can be transmitted over the IEEE 802.16 network. Therefore, even though the number of multicast addresses used in the network increases, additional MCID allocation is unnecessary. Accordingly, good extensibility can be achieved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the present invention as defined by the appended claims. Therefore, the method of allocating an extensible MCID for IPv6 multicast packet transmission over the IEEE 802.16/Wibro according to the present invention is not limited to the aforementioned exemplary embodiments. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allocating an MCID for IP multicast packet transmission in various categories over a portable Internet network, the method comprising: identifying a sublayer used for the IP multicast packet transmission and including a CS descriptor value representing the sublayer as one or more bits in the MCID; and identifying a subnet category of a subnet in which the IP multicast packet is transmitted and including a scope value representing the subnet category as one or more bits in the MCID.

2. The method of claim 1, wherein the CS descriptor value is an M flag having one bit, and wherein a value of the M flag represents whether the sublayer is an IP CS or an Ethernet CS.

3. The method of claim 1, wherein the scope value has 4 bits and is the same as a scope value of a destination IP address of the IP multicast packet.

4. The method of claim 1, wherein the portable Internet network is an IEEE 802.16 network, and wherein the IP multicast packet is an Internet protocol version 6 (Ipv6) multicast packet.

* * * * *